Sept. 10, 1957  J. H. BRENNAN ET AL  2,805,873
COUPLING FOR THREADLESS PIPES
Filed Sept. 21, 1954  2 Sheets-Sheet 1
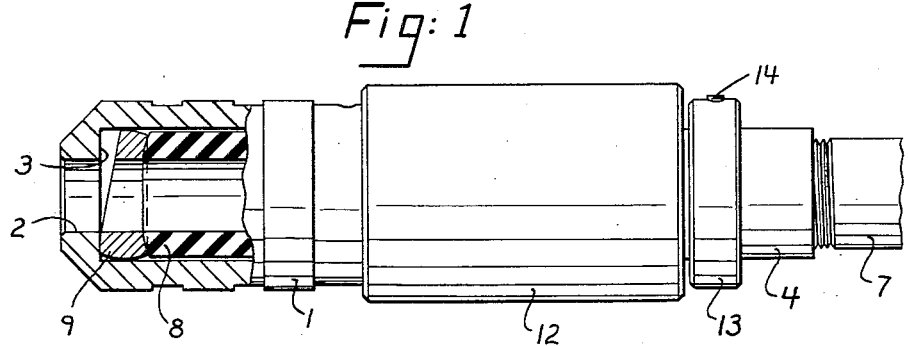
Fig: 1
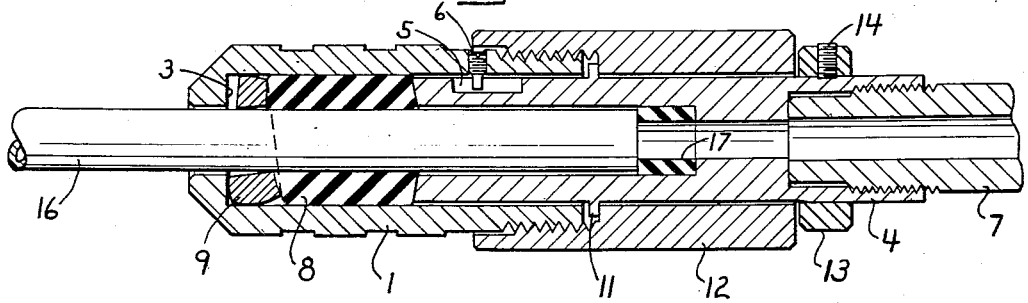
Fig: 2
INVENTORS
JAMES H. BRENNAN, CARL R. TRUXAL
& FRANK ULRICH
BY
Brown, Critchlow, Flick & Peckham
THEIR ATTORNEYS

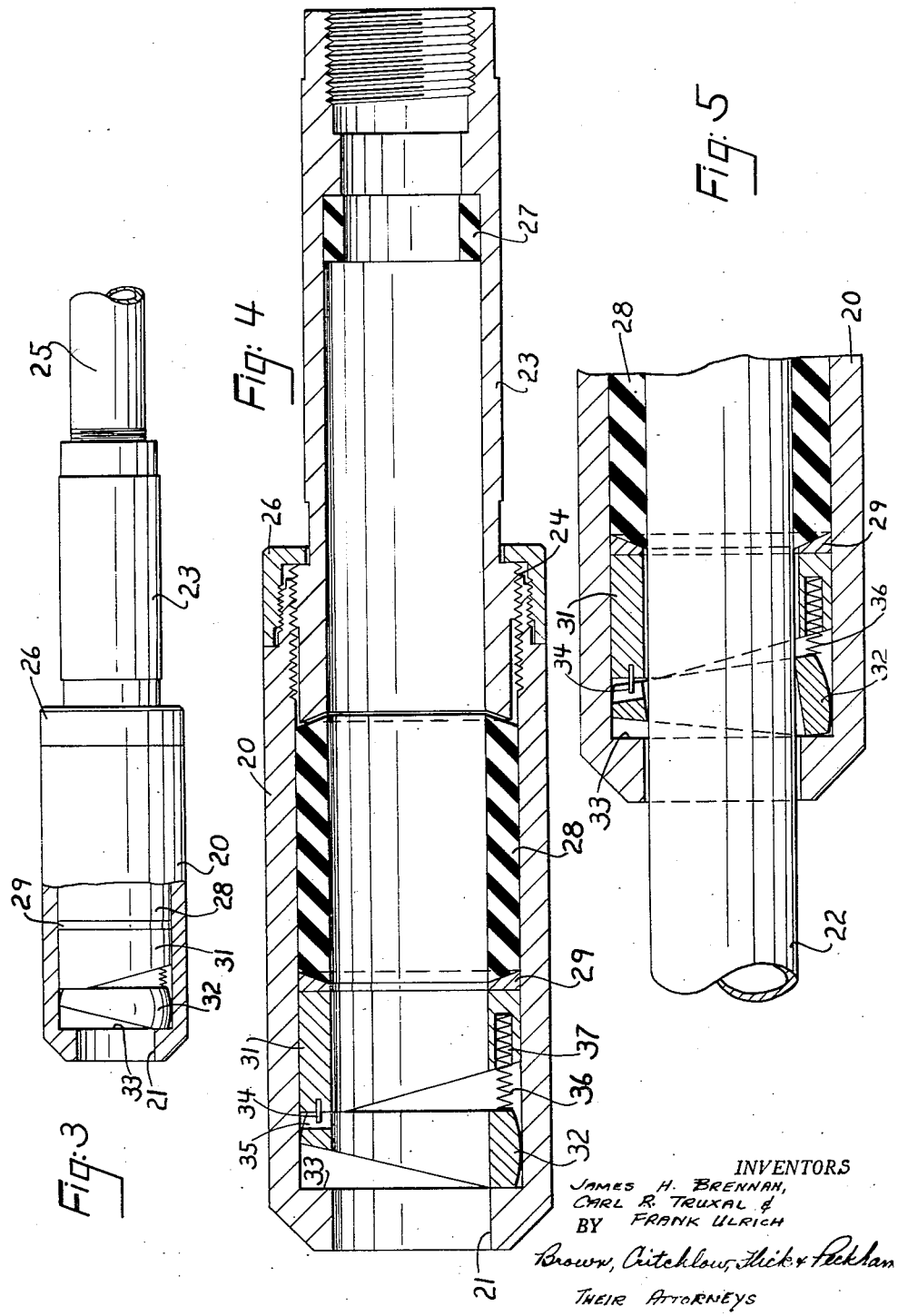

United States Patent Office 2,805,873
Patented Sept. 10, 1957

2,805,873

COUPLING FOR THREADLESS PIPES

James H. Brennan, Pittsburgh, Carl R. Truxal, Manor, and Frank Ulrich, Pittsburgh, Pa., assignors to Pittsburgh Brass Manufacturing Company, Pittsburgh, Pa., a corporation of Pennsylvania Application September 21, 1954, Serial No. 457,352

8 Claims. (Cl. 285—317)

This invention relates to couplings for pipes, and more particularly to a coupling that can be quickly attached to a threadless pipe.

There are some situations where it is desirable to be able to quickly connect a conduit to a pipe without screwing them together. For example, the lances that are used to burn the plugs out of the tapping holes of open hearth furnaces and the like include a long pipe that is connected through a suitable flexible connection or conduit with a source of combustible gas. It is the practice to disconnect the lances from the supply lines fairly frequently for replacement or other reasons. If the lances are provided with screw threads it requires an undesirable amount of time to make a sealed connection with the supply line, and also the threads often are damaged and have to be repaired before the lances can be used.

It is among the objects of this invention to provide a pipe coupling which can connect a conduit to an unthreaded pipe, and which can make such a connection quickly and easily.

In accordance with this invention, the pipe coupling includes a tubular socket that has a reduced opening in its front end encircled by an internal shoulder. A compression tube is mounted in the rear end of the socket and projects from it, with its outer end formed for connection to a conduit in any suitable manner. Inside of the socket in front of the compression tube there is a sealing sleeve, between which and the socket shoulder there is a locking ring. The front end of the ring is inclined to the axis of the socket and one side of the ring preferably always engages the shoulder. The ring and the sleeve and the compression tube are adapted to slidingly receive a pipe inserted through the socket opening. Mounted in the compression tube in a position to be engaged at one end by the pipe is a resilient bushing. After a pipe has been inserted in this coupling the compression tube is moved forward to force the sleeve to cant the ring and thereby cause it to tightly grip the pipe. Compression of the sleeve insures a seal between it and the pipe and the surrounding socket. The resilient bushing allows the compression tube to be moved forward slightly after the ring starts to grip the pipe, to insure a firm grip.

The invention is illustrated in the accompanying drawings, in which:

Fig. 1 is a side view of one form of coupling with the front partly broken away;

Fig. 2 is a central longitudinal section through the coupling connecting two pipes;

Fig. 3 is a side view of a modification with part of the socket broken away;

Fig. 4 is an enlarged central longitudinal section therethrough; and

Fig. 5 is a fragmentary section showing the coupling gripping a pipe.

Referring to Figs. 1 and 2 of the drawings, the coupling is formed from a plurality of tubular members that are associated in a manner that now will be described. The front part of the coupling is formed from a tubular socket 1 that has an opening 2 in its front end which is of smaller diameter than the inside of the socket. Consequently, a radial shoulder 3 is formed inside the socket between the opening and the side wall of the socket. Opening 2 is only slightly larger than the pipe that is to be connected to the front of the coupling.

Slidably mounted in the rear end of the socket and projecting therefrom is a compression tube 4. To prevent the tube from rotating in the socket, its front part is provided outside with a longitudinally extending slot 5 that receives the projecting inner end of a pin 6 which is screwed into a radial opening in the side wall of the socket. This pin and slot also limit the distance the tube can move out of the socket. The outer end of the tube may be internally threaded or otherwise formed for connection to a supply conduit 7, which may be flexible or provided with a flexible joint.

The concave front end of the tube engages the rear end of a flexible sealing sleeve 8 that is made of rubber or similar impervious resilient material. Disposed between the front end of the sleeve and socket shoulder 3 is a metal locking ring 9 that has a concave rear end receiving the tapered end of the sleeve. The front end of the ring is inclined to the axis of the socket, so that one side of the ring is spaced from the shoulder while the opposite side of the ring engages flat against the shoulder.

The compression tube is encircled behind the socket by an integral collar 11, which normally is spaced some distance from the socket. The back of the collar is engaged by a shoulder inside of a tubular nut 12 threaded on the rear end of the socket. When the nut is screwed forward on the socket, it pushes the compression tube forward in the socket. When the nut is reversed, it pushes against a removable collar 13 held on the rear end of the tube by a set screw 14. This collar also prevents the nut from being completely removed from the socket in use.

When this coupling is used, a pipe 16 (Fig. 2) is inserted through the opening in the front end of the socket and back through the locking ring and sealing sleeve and part way through the compression tube. Insertion of the pipe is stopped by its engagement with the front end of a resilient bushing 17 mounted in the tube against a radial shoulder. The tubular nut 12 then is screwed forward on the socket to push the compression tube forward. As the tube moves ahead in the socket it compresses the flexible sleeve 8 lengthwise and thereby thickens its side wall so that the sleeve tightly engages the pipe and the inside of the socket to form a seal between them. At the same time, the sleeve is pushed tightly against the locking ring. Assuming that one side of the ring is in engagement with socket shoulder 3, that side cannot move forward any farther, so the pressure of the diametrically opposite side of the sleeve against the ring cants the ring by rocking it forward towards the shoulder as shown in Fig. 2. As soon as the ring starts to cant, the edges of the hole through it move into tight engagement with the pipe and keep it from moving forward. However, due to the resilient bushing 17 between the inner end of the pipe and the compression tube, the latter can be slid forward a short distance on the pipe to cant the ring still farther so that it will be sure to grip the pipe very securely. The pipe not only is securely locked in the coupling, but fluid from conduit 7 cannot escape around the pipe because the bushing 17 and the sleeve 8 form good seals. All that is necessary to remove the pipe from the coupling is to rotate the tubular nut 12 to back it part way off the socket, whereby the resilient sleeve will be permitted to resume its normal shape and the locking ring therefore will no longer be held in canted position. The pipe then can be pulled out of the coupling.

It will be seen that this coupling can be quickly connected to or disconnected from a threadless pipe by merely rotating the tubular nut on the socket. However, no metal surfaces are rotated against the bushing or the flexible sleeve, which would wear them, because the compression tube is moved back and forth in the socket in a straight line.

The modification shown in Figs. 4, 5 and 6 is more suitable for pipes of large diameter than is the first embodiment. In this modification the tubular socket 20 likewise has a reduced opening 21 in its front end for receiving a threadless pipe 22. In the rear end of the socket there is a compression tube 23, but to move it axially of the socket it has to be rotated because the two are connected together by screw threads 24. The outer end of the tube is threaded inside for connection to a supply conduit 25 (Fig. 3). Removal of the tube from the socket is prevented by a collar 26 screwed on the rear end of the socket. Inside of the compression tube near its rear end there is a shoulder engaged by the rear end of a resilient bushing 27.

Engaging the concave front end of the compression tube is a flexible resilient sealing sleeve 28, the beveled front end of which preferably fits in a metal washer 29. This washer engages the flat rear end of a spacing ring 31, the front end of which engages a locking ring 32. The front end of the locking ring is inclined to the axis of the socket and therefore engages the socket shoulder 33 at only one side of opening 21. The two rings engage each other only at the point on the locking ring diametrically opposite to the point where it engages the socket shoulder. This is accomplished by inclining one of the rings away from each other, the front end of the spacing ring preferably being inclined for this purpose. To prevent the two rings from rotating relative to each other and thereby getting out of correct position, their adjoining ends may be provided with an interengaging pin 34 and notch 35. For a purpose about to be described a coil spring 36 is compressed between the two rings at a point diametrically opposite the pin and notch. The spring is mounted in a hole 37 in the front end of the spacing ring.

This coupling grips a pipe 22 inserted through the socket in the same way as the first embodiment of the invention, by canting the locking ring to cause it to grip the pipe. The locking ring is canted by screwing compression tube 23 forward in the socket and thereby causing sealing sleeve 28 to push washer 29 and spacing ring 31 ahead so that the spacing ring will cause the locking ring to rock forward against the socket shoulder. During this operation the resilient bushing 27 in the compression tube is compressed to some extent by the inner end of the pipe, thereby assuring that the tube is moved ahead far enough to cause the locking ring to securely anchor the pipe. When the compression tube is rotated in the socket the tube will rotate the sleeve with it until the sleeve is pressed tightly into sealing engagement with the pipe and socket. By having the front end of the sleeve fit against the washer, the washer will be rotated by the sleeve against the spacing ring. Consequently, neither end of the sleeve is worn materially by sliding on a metal surface.

The pressure of the spring 36 against the locking ring prevents any tendency of the locking ring to rock forward when no pipe is in the coupling, which might cause the pin and notch to become disengaged and permit the locking ring to rotate out of position relative to the spacing ring. The spring also helps to move the spacing ring and sleeve backward in the socket when the compression tube is retracted, so that the locking ring can release the pipe.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A pipe coupling comprising a tubular socket having a reduced opening in its front end encircled by an internal shoulder, a compression tube mounted in the rear end of the socket and projecting therefrom, the outer end of the compression tube being adapted to be connected to a conduit, a flexible sealing sleeve in front of the compression tube, a tiltable locking ring disposed between the sleeve and said shoulder and having its front end inclined to the axis of the socket to space one side of the ring from the shoulder, said ring and sleeve and compression tube being adapted to slidingly receive a pipe inserted through said socket opening, a resilient bushing mounted in the compression tube in a position to be engaged at one end by the pipe, said compression tube being movable forward in the socket to force the sleeve to cant the ring, and means engaging the compression tube for holding it in its forward position.

2. A pipe coupling comprising a tubular socket having a reduced opening in its front end encircled by an internal shoulder, a compression tube mounted in the rear end of the socket and projecting therefrom and provided with a forwardly facing internal shoulder, the outer end of the compression tube being adapted to be connected to a conduit, a flexible sealing sleeve in front of the compression tube, a tiltable locking ring disposed between the sleeve and socket shoulder, one side of the ring engaging the socket shoulder and the opposite side being spaced from that shoulder, said ring and sleeve and compression tube being adapted to slidingly receive a pipe inserted through said socket opening, a resilient bushing mounted in the compression tube against said tube shoulder and adapted to be engaged at its front end by the pipe, said compression tube being movable forward in the socket to force the sleeve to rock the ring against said socket shoulder, and means for holding the compression tube in its forward position.

3. A pipe coupling according to claim 1, in which said tube-holding means is screwed on said socket for effecting said forward movement of the compression tube also.

4. A pipe coupling comprising a tubular socket having a reduced opening in its front end encircled by an internal shoulder, a compression tube mounted in the rear end of the socket and projecting therefrom, the outer end of the compression tube being adapted to be connected to a conduit, a flexible sealing sleeve in front of the compression tube, a tiltable locking ring disposed between the sleeve and said shoulder and having its front end inclined to the axis of the socket to space one side of the ring from the shoulder, said ring and sleeve and compression tube being adapted to slidingly receive a pipe inserted through said socket opening, a resilient bushing mounted in the compression tube in a position to be engaged at one end by the pipe, and means for sliding said tube forward in the socket to force the sleeve to cant the ring.

5. A pipe coupling comprising a tubular socket having a reduced opening in its front end encircled by an internal shoulder, a compression tube mounted in the rear end of the socket and projecting therefrom, the outer end of the compression tube being adapted to be connected to a conduit, a flexible sealing sleeve in front of the compression tube, a tiltable locking ring disposed between the sleeve and said shoulder and having its front end inclined to the axis of the socket to space one side of the ring from the shoulder, said ring and sleeve and compression tube being adapted to slidingly receive a pipe inserted through said socket opening, a resilient bushing mounted in the compression tube in a position to be engaged at one end by the pipe, said compression tube being encircled behind the socket by a collar, and a rotatable member screwed on the rear end of the socket and engaging the rear face of the collar for moving the compression tube forward in the socket to force the sleeve to cant the ring.

6. A pipe coupling according to claim 2, including a spacing ring between the sleeve and locking ring in engagement therewith, the adjoining ends of the two rings being inclined away from each other to provide a space between them diametrically opposite to the side of the locking ring that is spaced from the socket shoulder.

7. A pipe coupling in accordance with claim 6, including a coil spring spanning the space between the ends of the two rings and compressed between them.

8. A pipe coupling in accordance with claim 6, including means holding the two rings from rotating relative to each other.

References Cited in the file of this patent

UNITED STATES PATENTS

| | | |
|---|---|---|
| 616,578 | Love | Dec. 27, 1898 |
| 1,581,975 | Meyer | Apr. 20, 1926 |
| 1,930,833 | Barrett | Oct. 17, 1933 |
| 1,960,518 | Thompson et al. | May 29, 1934 |
| 2,083,794 | Roby | June 15, 1937 |
| 2,247,032 | Norton | June 24, 1941 |
| 2,316,806 | Parker | Apr. 20, 1943 |
| 2,397,749 | Mendelson | Apr. 2, 1946 |
| 2,450,170 | Smith | Sept. 28, 1948 |
| 2,478,586 | Krapp | Aug. 9, 1949 |
| 2,691,537 | Bashark | Oct. 12, 1954 |

FOREIGN PATENTS

| | | |
|---|---|---|
| 62,898 | Austria | Jan. 10, 1914 |
| 808,647 | France | Nov. 14, 1936 |
| 887,813 | France | Nov. 24, 1943 |
| 571,643 | Great Britain | Sept. 3, 1945 |